US012638861B2

(12) United States Patent (10) Patent No.: US 12,638,861 B2
Audronis (45) Date of Patent: May 26, 2026

(54) LAYER APPROACH TO MANAGING AIRSPACE OF LARGE GROUPS OF DRONES

(71) Applicant: Tempest Droneworx, Inc., Houston, TX (US)

(72) Inventor: Tyris Monte Audronis, Houston, TX (US)

(73) Assignee: Tempest Droneworx, Inc., Houston, TX (US)

( * ) Notice: Subject to any disclaimer, the term of this patent is extended or adjusted under 35 U.S.C. 154(b) by 64 days.

(21) Appl. No.: 18/614,426

(22) Filed: Mar. 22, 2024

(65) Prior Publication Data

US 2024/0319748 A1 Sep. 26, 2024

Related U.S. Application Data

(60) Provisional application No. 63/491,694, filed on Mar. 22, 2023.

(51) Int. Cl.
| | |
|---|---|
| *G05D 1/692* | (2024.01) |
| *G05D 1/648* | (2024.01) |

(Continued)

(52) U.S. Cl.
CPC ............. *G05D 1/692* (2024.01); *G05D 1/648* (2024.01); *G05D 2105/85* (2024.01); *G05D 2109/20* (2024.01)

(58) Field of Classification Search
CPC ...... G05D 1/225; G05D 1/2295; G05D 1/648; G05D 1/692; G05D 1/693; G05D 1/6987;

(Continued)

(56) References Cited

U.S. PATENT DOCUMENTS

| | | |
|---|---|---|
| 10,717,528 B1 | 7/2020 | Tran |
| 2016/0335898 A1 | 11/2016 | Caplan et al. |

(Continued)

FOREIGN PATENT DOCUMENTS

| | | |
|---|---|---|
| WO | 2024197281 A2 | 9/2024 |
| WO | 2024197281 A3 | 12/2024 |

OTHER PUBLICATIONS

International Search Report and Written Opinion for International Application No. PCT/US2024/021208, Search completed Oct. 14, 2024, Mailed Nov. 15, 2024, 10 Pgs.

(Continued)

*Primary Examiner* — Babar Sarwar
(74) *Attorney, Agent, or Firm* — KPPB LLP

(57) ABSTRACT

A method for coordinating drones flying in a divided airspace that includes sending patrol instructions to each drone of a set of airborne drones in a divided airspace, where the divided airspace includes mutually exclusive horizontal layers having a ceiling altitude and a floor altitude and at least one transition space layer, where the layers comprise sectors, where the patrol instructions direct the drone into a flight path in a sector, sending first transition instructions to a first drone, where the transition instructions direct the first drone to move from its sector to a transition space layer and from the transition space layer to exit the divided airspace, sending second transition instructions to a second drone, where the second transition instructions direct the second drone to move from outside the divided airspace to a transition space layer and from the transition space layer to the sector of the first drone.

14 Claims, 9 Drawing Sheets

(51) Int. Cl.
    *G05D 105/85*     (2024.01)
    *G05D 109/20*     (2024.01)

(58) Field of Classification Search
    CPC ........... G05D 2105/85; G05D 2109/20; G05D 2109/22; G05D 2109/254
    See application file for complete search history.

(56)                References Cited

U.S. PATENT DOCUMENTS

| | | | |
|---|---|---|---|
| 2016/0371985 A1* | 12/2016 | Kotecha | H04B 7/18506 |
| 2017/0192424 A1* | 7/2017 | Poole | G01C 21/20 |
| 2018/0045522 A1* | 2/2018 | Aziz | B64U 30/26 |
| 2018/0058864 A1* | 3/2018 | Lection | G01C 21/3415 |
| 2019/0332974 A1* | 10/2019 | Karatekeli | H04L 67/125 |
| 2019/0385463 A1 | 12/2019 | Cantrell et al. | |
| 2020/0156784 A1* | 5/2020 | Carnell | B64D 1/02 |
| 2021/0334538 A1* | 10/2021 | Marotta | G06K 7/1417 |
| 2022/0058960 A1* | 2/2022 | Stein | G08G 5/76 |
| 2022/0081923 A1* | 3/2022 | Wankewycz | B64U 80/30 |
| 2024/0176366 A1* | 5/2024 | Mclaughlin | G08G 5/54 |
| 2024/0177619 A1* | 5/2024 | Kubie | G01C 21/16 |

OTHER PUBLICATIONS

International Preliminary Report on Patentability for International Application PCT/US2024/021208, Report issued Sep. 20, 2025, Mailed Oct. 2, 2025, 9 Pgs.

\* cited by examiner

LAYER APPROACH TO MANAGING AIRSPACE OF LARGE GROUPS OF DRONES

CROSS-REFERENCE TO RELATED APPLICATIONS

The current application claims priority under 35 U.S.C. § 119(e) to U.S. Provisional Application No. 63/491,694, entitled "Layer Approach to Managing Airspace of Large Groups of Drones" to Tyris Monte Audronis, filed Mar. 22, 2023, the disclosure of which is expressly incorporated by reference herein in its entirety.

BACKGROUND

An unmanned vehicle, or drone is a type of vehicle that can be powered or unpowered without a person directly operating it onboard. The vehicle can be operated remotely (e.g., by a human operator/pilot) or autonomously (e.g., using sensors and/or navigational programming). Unmanned vehicles can be designed for different environments, such as, but not limited to, unmanned aerial vehicles (UAV), unmanned ground vehicles (UGV), unmanned surface vehicles (USV), and unmanned underwater vehicles (UUV).

Drones can utilize any of a variety of sensors such as, but not limited to, cameras, infrared (thermal) sensors, LiDAR (Light Detection and Ranging), sonar, etc. At an elevated vantage point, UAVs having onboard sensors can often collect data at a greater range and with less influence from obstructions than if they were on the ground. UGVs, USVs, and UUVs with sensors can traverse and collect information in environments that are difficult or undesirable for a human.

Drones for information gathering over a large area are particularly useful in emergency and disaster situations. With little to no direct human supervision, they can obtain visual and other information at great speed and effectiveness to enhance planning and remediation by responders.

DETAILED DISCLOSURE OF THE INVENTION

Turning now to the drawings, systems and methods for a layer approach to managing airspace of large groups of drones are described. Drones can be used to collect information over large geographic areas via onboard sensors. This can be useful, for example, in disaster recovery scenarios to survey the environment for planning and assessment. The drones can follow defined paths, navigate autonomously, or be manually controlled to cover as much of the area of interest as possible. A user interface can display a virtual environment and can provide controls for a user to direct a drone to a specific location. In this way, a user can visually review information over large areas live or in close to real-time via systematic navigation of the one or more drones.

An airspace to be covered by a set of drones can be divided into layers (vertical separation) and sectors within layers (horizontal separation). In several embodiments of the invention, sectors within a layer are equally shaped and sized. For example, sectors can be set out in a grid pattern. Sectors may be shapes that can fit within a grid pattern, e.g., rectangles, squares, hexagons. In additional embodiments, sectors within a layer can be different shape and/or size from sectors in another layer.

Certain types of drones may be suitable or appropriate for certain layers depending on the altitude of the layer and the characteristics of the type of drone and/or coverage of the sensor carried by the drone. For example, fixed wing drones typically fly at higher altitudes and greater speeds, while multicopters typically operate at lower altitudes and speeds and have the capability of hovering.

One or more drones can be assigned to each sector. Furthermore, each drone can be programmed with a patrolling flight path (e.g., onboard or remotely controlled) within its sector. As will be discussed further below, patrolling can include repeating a flight path to cover a sector while capturing information using sensors. In additional embodiments of the invention, drones can each include one or more sensors (e.g., camera, infrared sensor, etc.), collect sensor data using the sensor during flight, and store the collected sensor data onboard or transmit sensor data to a receiver (e.g., ground or air-based).

Systems for Collecting Sensor Data From Drones

Figure 1:
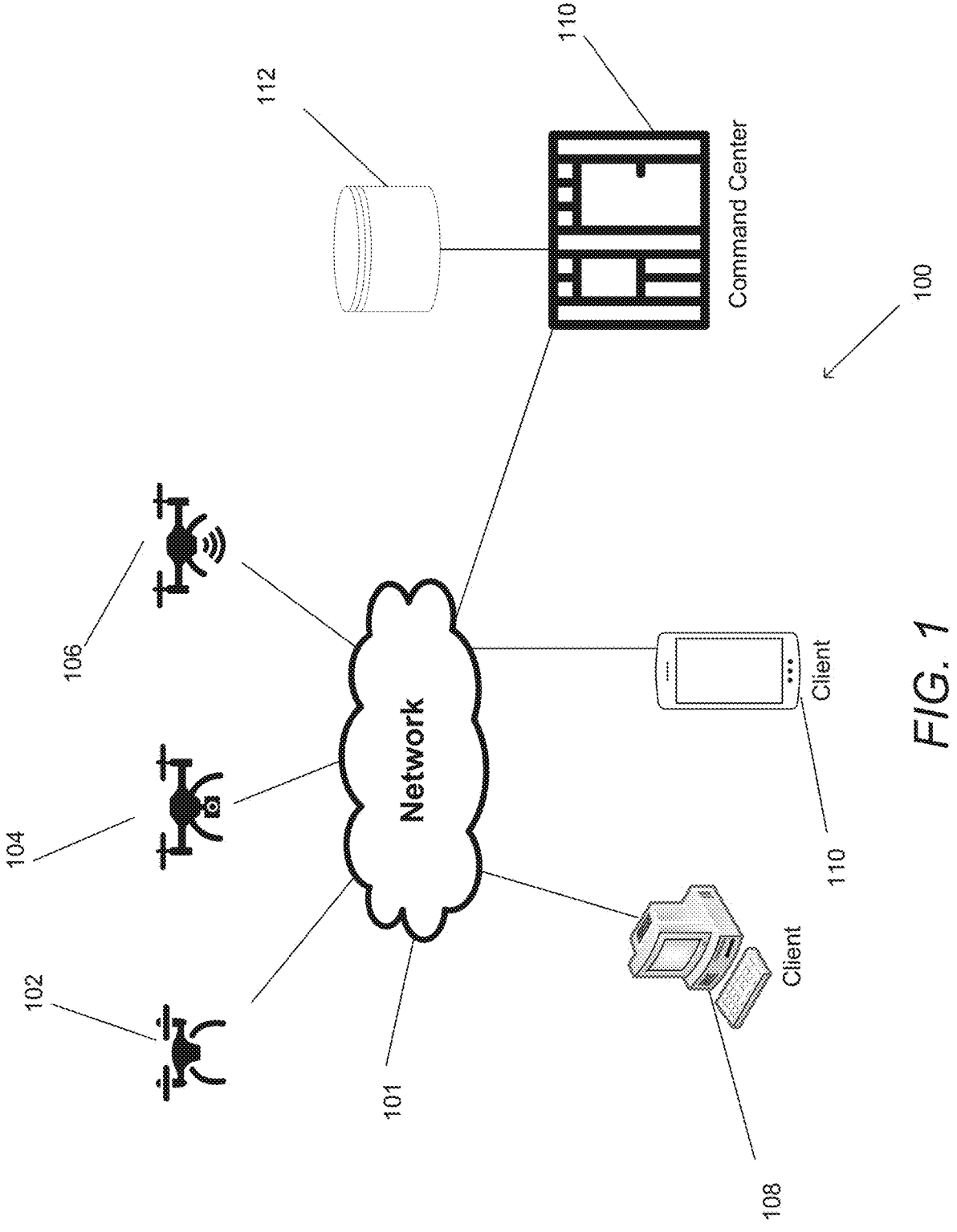
FIG. 1 illustrates a system for collecting sensor data from drones in accordance with an embodiment of the invention.

FIG. 1 illustrates a system 100 for collecting sensor data from drones in accordance with an embodiment of the invention that includes one or more drones 102, 104, and 106, a drone command center 110, a data center 112, and one or more client devices 108 and 110. In the illustrated embodiment, the entities can communicate over a wide area network 101, such as the internet. Drones can include those adapted for different environments, such as, but not limited to, unmanned aerial vehicles (UAV), unmanned ground vehicles (UGV), unmanned surface vehicles (USV), and unmanned underwater vehicles (UUV). Each drone may include at least one sensor. Sensors can include, but are not limited to, cameras, infrared (thermal) sensors, LiDAR (Light Detection and Ranging), sonar, olfactory/particle sensors, auditory sensors, etc. Further embodiments of the invention can include cameras and/or other types of sensors 114 that are not mounted on drones. These sensors may be stationary, and may have an associated GPS (global positioning system) circuitry or system that identifies their location. For example, a camera or sensor can have an embedded GPS tracker or may be mounted to another system (e.g., a structure or a non-moving vehicle) that includes a GPS. Some stationary camera systems can include, for example, public wildfire monitoring systems.

The drone command center 110 can include controller interfaces for the drones. In several embodiments of the invention, each drone has its own associated controller interface, e.g., Pixhawk Cube. The drone command center 110 may also have one or more computing systems that can coordinate the controller interfaces, execute a 3-D visualization software application (e.g., game engine) for the virtual environment, and/or generate information for a user interface on the one or more client devices 108 and 110 to display the virtual environment. Processes that may be performed at a drone command center 110 include those discussed further below.

The data center 112 can include one or more databases. Databases can store drone information/metadata and geometry data. Notably, in some embodiments, separate data centers can house databases for different types of information.

Figure 2:
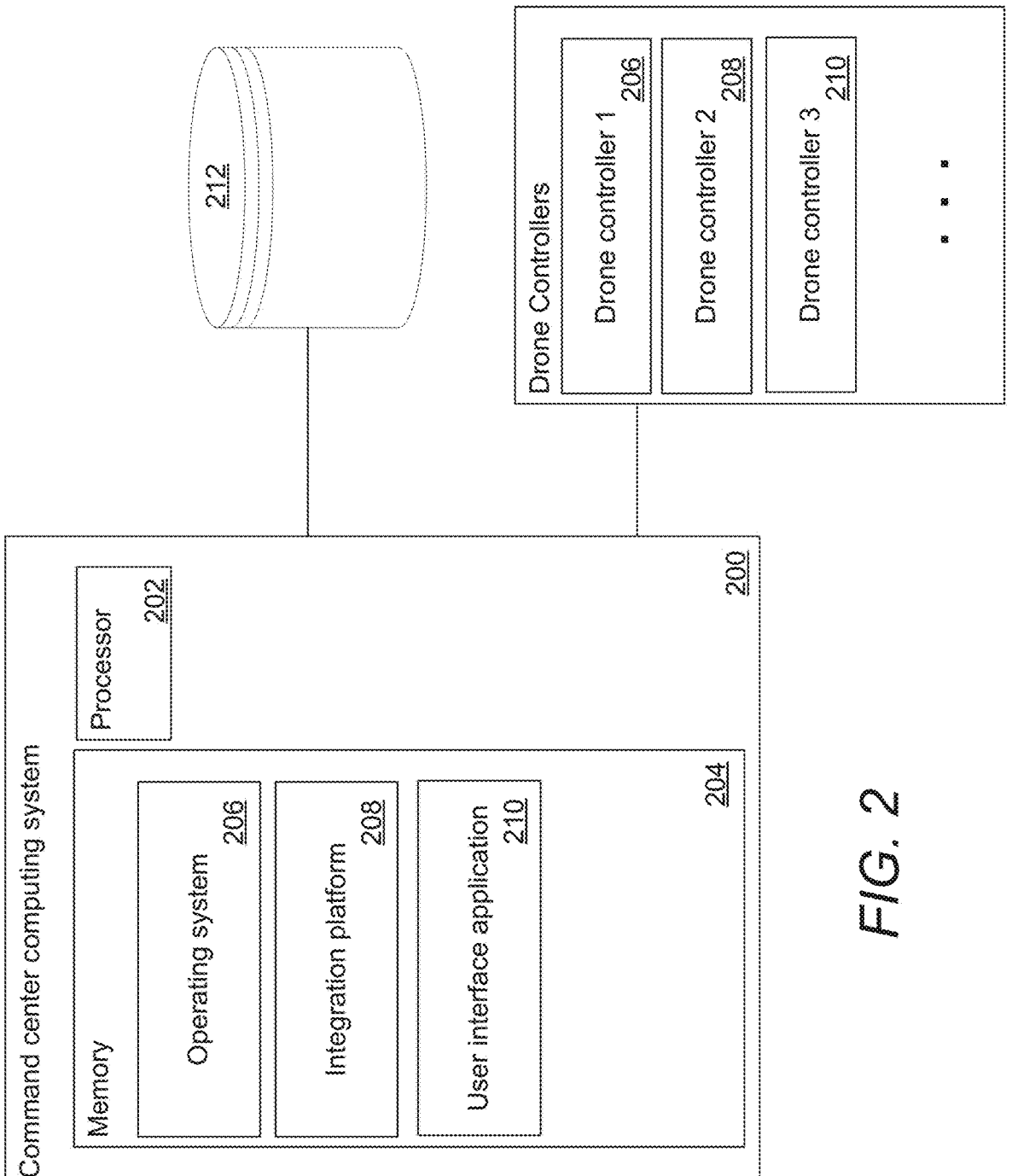
FIG. 2 conceptually illustrates a command center computing system in accordance with an embodiment of the invention.

A computing system that may be utilized at a command center in accordance with embodiments of the invention is conceptually illustrated in FIG. 2. The computing system 200 includes a processor 202 and memory 204. The memory 204 contains processor instructions for executing an operating system 206, a sensor data integration platform 208, and a user interface application 210. The computing system 200 can access a data center 212 as mentioned further above. The computing system 200 may also interface with one or more drone controllers 206, 208, and 210 that are configured to control drones (e.g., drones 102, 104, and 106 as in FIG. 1). Drone controllers can be any suitable type or model, such as the Pixhawk Cube. Using the drone controllers 206, 208, and/or 210, the computing system 200 may direct the drones to patrol sector(s) of an airspace at a particular layer by sending instructions to drones to execute flight paths in processes such as those described further below. While specific systems are described above with respect to FIGS. 1 and 2, one skilled in the art will recognize that any of a variety of systems may be utilized in accordance with embodiments of the invention as appropriate to a particular application.

Airspace Division

Drones can patrol within a defined airspace over a geographic area. The airspace can be conceptually divided vertically into layers (e.g., by altitude) and horizontally into sectors (e.g., by a grid of geometric shapes that can repeat) within each layer. Sectors of a layer can be bounded by a lower altitude (a floor) and an upper altitude (a ceiling). In several embodiments of the invention, the space between layers (e.g., between the ceiling of one layer and the floor of the next layer) can be referred to as transition space. Transition space is intended to be utilized for drones to move in and out of their assigned sectors and not for ongoing flight or patrolling of drones.

In several embodiments of the invention, sectors within a layer are equally shaped and sized. For example, sectors can be set out in a grid pattern. Sectors may be shapes that can fit within a grid pattern, e.g., rectangles, squares, hexagons. In additional embodiments, sectors within a layer can be different shape and/or size from sectors in another layer.

One or more drones can be assigned to each sector. In many embodiments, each sector can only be assigned a maximum number of drones (e.g., two). Furthermore, each drone can be programmed with a patrolling flight path (e.g., onboard or remotely controlled). In some embodiments, the flight of each drone within a sector is set to a different altitude to avoid collision. In additional embodiments of the invention, drones can each include one or more sensors (e.g., camera, infrared sensor, etc.), collect sensor data using the sensor during flight, and store the collected sensor data onboard or transmit sensor data to a receiver (e.g., ground or air-based). Due to the field of view, resolution, and/or other characteristics of different types of sensors, it may be appropriate for certain types of sensors to be used in a lower layer and other types of sensors to be used in a higher layer.

Similarly, due to the flight mechanics and other characteristics of different types of drones, it may be appropriate for certain types of drones to be used in a lower layer (e.g., multicopter, rotary, etc.) and other types of drones to be used in a higher layer (e.g., fixed wing, Vertical Take-Off and Landing, forward thrust, etc.)

Figure 3:
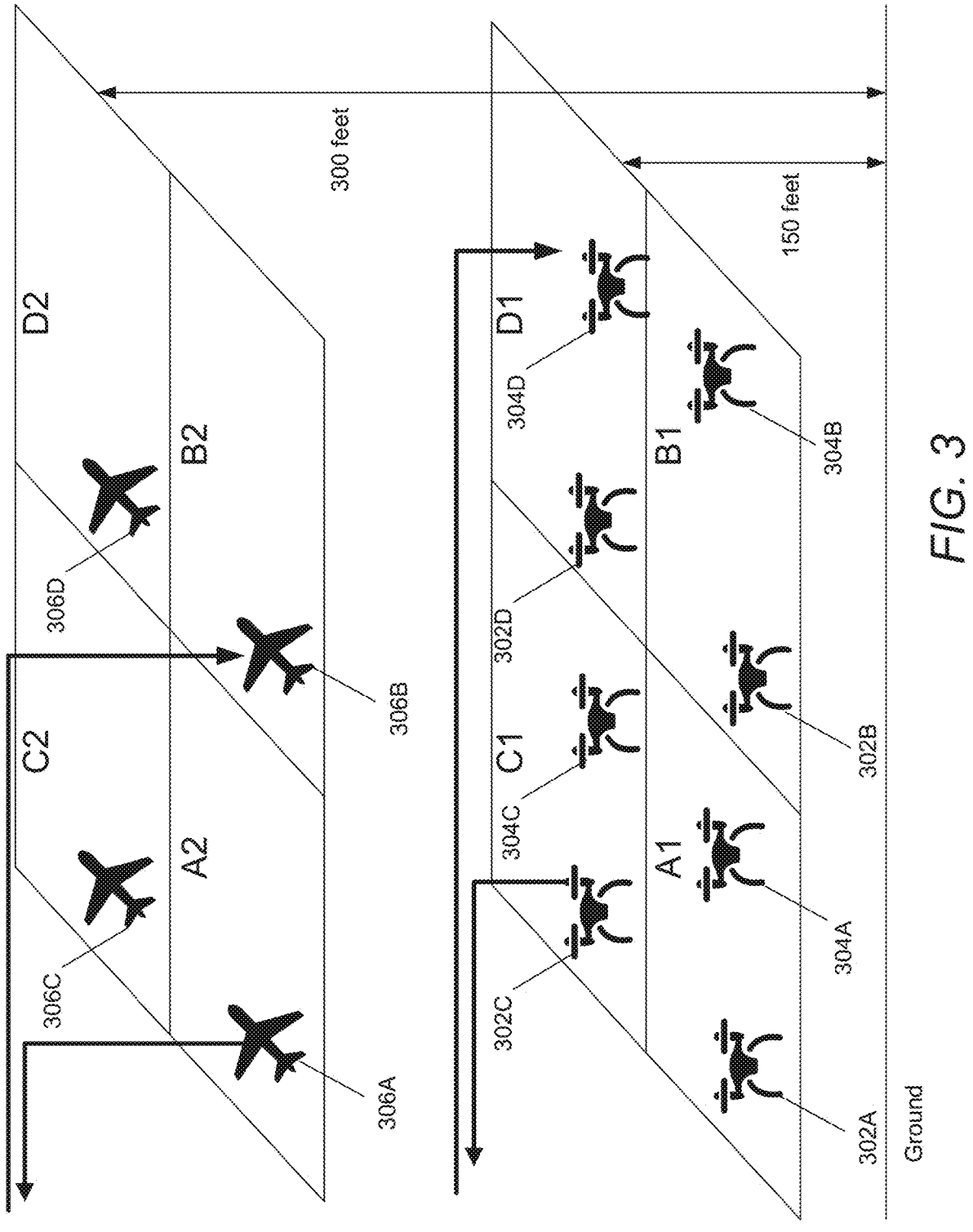
FIG. 3 illustrates an example airspace with drone transitions in accordance with an embodiment of the invention.

An example airspace in accordance with an embodiment of the invention is illustrated in FIG. 3. The airspace is divided into two layers, a first layer closer to the ground and a second layer above the first layer. For the purposes of this illustration, the ground is at sea level.

The first layer at 150 feet altitude is a square divided into a grid of four square sectors A1, B1, C1, and D1. Drones 302A and 304A are assigned to sector A1. Drones 302B and 304B are assigned to sector B1. Drones 302C and 304C are assigned to sector C1. Drones 302D and 304D are assigned to sector D1. Drones 302A, 302B, 302C, and 302D are multicopters for mapping that include visual spectrum digital cameras. In this example, drones 304A, 304B, 304C, and 304D are multicopters for heat mapping that include infrared digital cameras. In other embodiments, other types of drones and/or sensors may be utilized.

The second layer at 300 feet altitude is a square divided into a grid of four square sectors A2, B2, C2, and D2. Drone 306A is assigned to sector A2. Drone 306B is assigned to sector B2. Drone 306C is assigned to sector C2. Drone 306D is assigned to sector D2. In this example, drones 306A, 306B, 306C, and 306D are fixed-wing sUAS with thermal cameras. In other embodiments, other types of drones and/or sensors may be utilized.

The airspace between the first layer and the second layer can be considered transition space, as well as the airspace above the second layer. As will be discussed further below, drones moving from outside the airspace into and out of their assigned sectors can traverse the transition space to avoid entering other sectors to which they are not assigned, and which may be occupied by other drones, to avoid collision.

In the example illustrated in FIG. 3, arrows conceptually depict simplified flight paths that drones may follow to utilize the transition space. Drone 302C rises in altitude (e.g., 160') to leave sector C1 and traverses the transition space between the layers to exit the airspace. Drone 304D enters the airspace through the transition space between the layers (e.g., 180') and travels to sector D1 and drops into appropriate altitude (e.g., 150'). Drone 306A rises in altitude (e.g., 350') to leave sector A2 and traverse the transition space between the layers to exit the airspace. Drone 306B enters the airspace through the transition space above the upper layer (e.g., 400') and travels to sector B2 and drops to the appropriate altitude (e.g., 300'). Similar paths can be followed by a drone that replaces another drone. For example, a drone 306A' (not pictured) can enter at 400' to replace drone 306A after it leaves its sector A2. In other embodiments, drones in the upper layer may also utilize the transition space between the layers.

In some embodiments of the invention, the drones are also restricted in proximity to each other during flight. They can be programmed to stay a certain distance (e.g., 25' or 50') away from each other.

Although a specific configuration is discussed above with respect to FIG. 3, one skilled in the art will recognize that any of a variety of configurations may be utilized in accordance with embodiments of the invention. In various embodiments, the airspace can include three or more layers, layers can be at different altitudes, transition spaces between layers can be different heights, layers can include different numbers of sectors, sectors can be different sizes in different layers, different numbers of drones may patrol the sectors, drones may have different types of sensors, and/or different types of drones may be assigned to each layer.

For example, in another embodiment one square sector of an upper layer can occupy the same area as four square sectors of a lower layer. In additional embodiments, layers can occupy a range of altitudes (floor of 20' to ceiling of 200' for a lower layer and floor of 300' to ceiling of 400' for an upper layer) rather than a set altitude. In further embodiments of the invention, an airspace can include three or more layers, where each layer is separated by a transition space. Another example can include the two layers described above with respect to FIG. 3 and also include a third layer at 225 feet having sectors patrolled by drones with LIDAR scanners.

Processes for Populating Airspace With Drones

Figure 4:
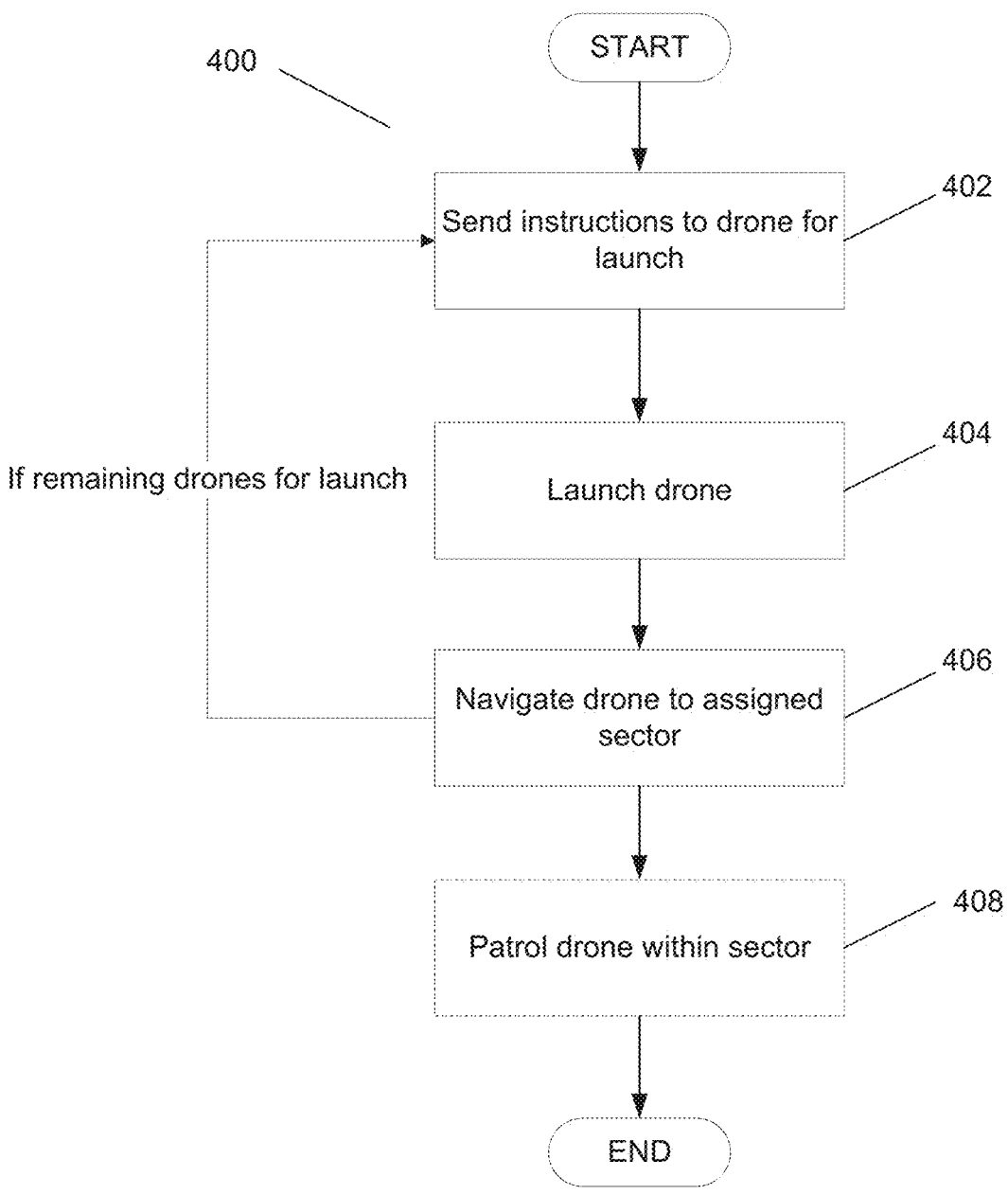
FIG. 4 illustrates a process for populating an airspace with drones in accordance with an embodiment of the invention.

Moving drones into their assigned sectors should be coordinated to avoid conflict and potential collusions. A process for populating sectors of an airspace with drones in accordance with embodiments of the invention is shown in FIG. 4.

The process 400 includes launching a first drone. For the purposes of discussion, the example airspace of FIG. 3 can be used. Launch instructions can be sent (402) to drone 302A to launch and navigate to sector A1. The drone executes the launch instructions to launch (404) and navigate (406) to its assigned sector A1. In several embodiments of the invention, drone 302A passes through the transition space between the first and second layers and avoids other sectors in the first and second layers except for its sector A1.

Launch instructions, patrol instructions, and transition instructions may be examples of flight instructions. Flight instructions to a drone can include, but are not limited to, components of a Bezier curve, e.g., GPS coordinates as waypoints, starting and ending vectors, and/or tension, or a linear path, as well as altitude. Instructions to store on the drone can also include an "exit path" specifying a route to exit the airspace through transition spaces when possible, in the event of communication loss.

The drone can patrol (408) its sector pursuant to its provided flight plans as patrol instructions. In some embodiments, patrol instructions can be provided to the drone before launch or during its travel to the assigned sector. In other embodiments, the flight plans for patrolling are updated after the drone reaches its sector. If any drones remain for launch, the process can repeat from 402. In the example of FIG. 3, a next drone to launch can be a second drone 302B. It receives instructions to launch and navigate to sector B1 through transition space.

In several embodiments of the invention, the next drone is not launched until the previous drone that was launched is stable (e.g., has three telemetry readings in a row each within tolerance, where telemetry includes location information).

In some embodiments, rather than each drone going directly to its sector, all drones move to the coordinates of their sectors but at a lower altitude. Once all drones are stable, then they move to the designated altitude of their sectors.

Although a specific process for populating an airspace with drones is described above with respect to FIG. 4, one skilled in the art will recognize that any of a variety of processes may be utilized in accordance with embodiments of the invention.

Processes for Transitioning Drones in and out of Airspace

Figure 5:
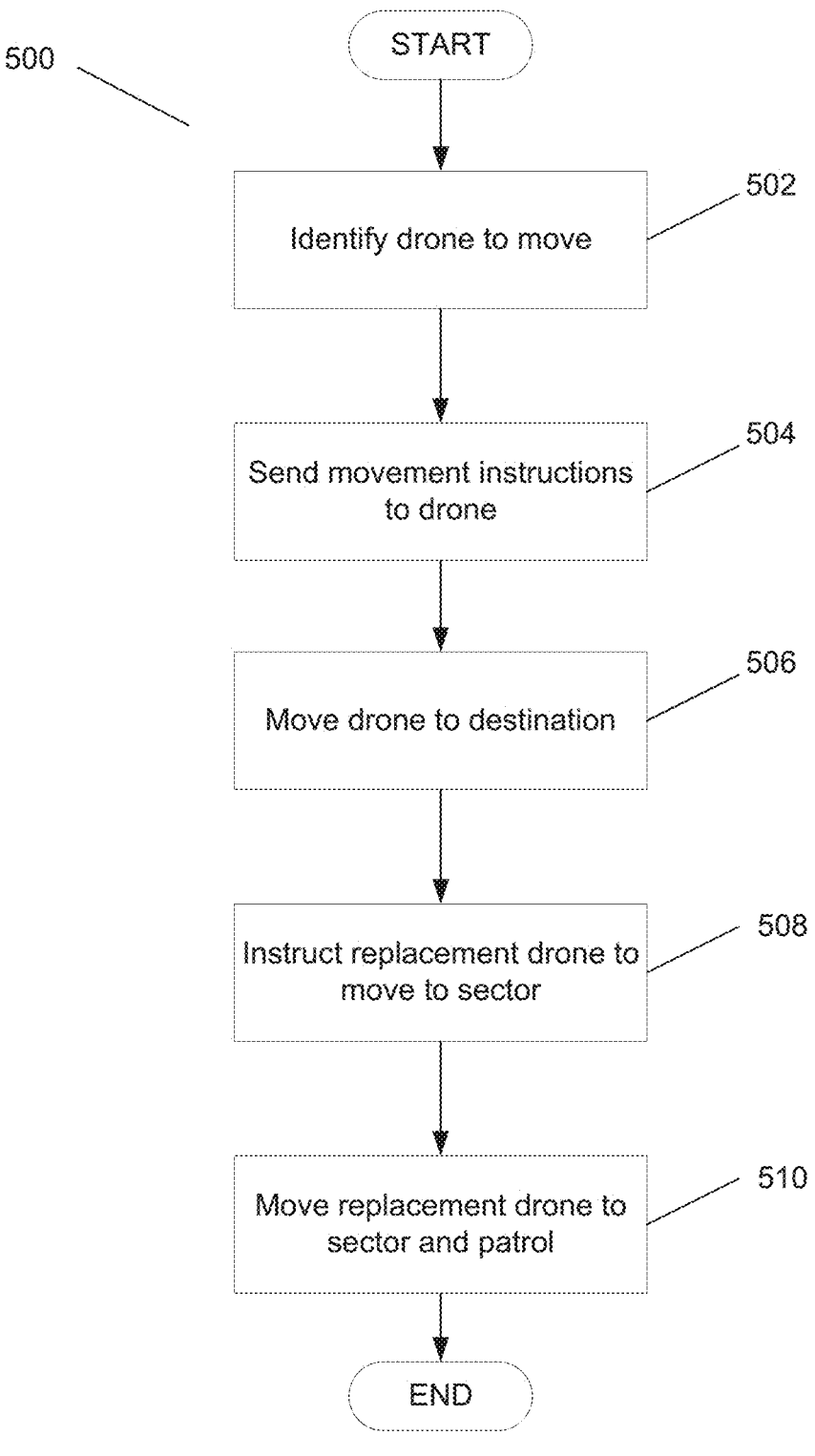
FIG. 5 illustrates a process for transitioning drones in accordance with an embodiment of the invention.

A drone may be removed from its sector and replaced with another drone for any of a variety of reasons, e.g., failure of a sensor, low battery, damaged mechanisms, etc. A process for replacing a drone by transitioning it out of its sector is illustrated in FIG. 5.

A first drone to move is identified (502). Transition instructions are sent to the drone (504). In many embodiments of the invention, the instructions specify that the first drone should move from its sector to transition space above or below its sector, without entering a different sector. Once within the transition space, it can move to a boundary of the overall airspace and exit the airspace. The destination can be a landing area for the drone.

The first drone is moved (506) according to its provided transition instructions. A replacement second drone is instructed (508) to move to the sector of the first drone by providing it with its own transition instructions. If not already in the air, the second drone can be launched and moved (510) to the sector. Once the second drone has reached the sector, it can implement patrol instructions to execute a flight plan to patrol the sector and capture information using at least one onboard sensor.

In certain embodiments, strategies may be employed to reduce the likelihood of collisions between an exiting drone (first drone) and an entering drone (second drone). For example, the second drone may be moved only after the first drone has reached a certain point, e.g., exited the sector, entered the transition space, exited the airspace, landed, etc. The second drone may be held outside the airspace or in a transition space. If the entering drone and exiting drone are coming and going on the same vector, they may be assigned different paths, e.g., clockwise and counterclockwise.

In some embodiments of the invention, the system limits to one or two drones transitioning out of their sectors at a time to avoid collisions.

Although a specific process for transitioning drones is discussed above with respect to FIG. 5, one skilled in the art will recognize that any of a variety of processes may be utilized in accordance with embodiments of the invention.

Adapting Flight Plans to Changes

In further embodiments of the invention, the flight plans or movements of one or more drones may be modified in response to changing conditions. More specifically, the flight plans may implement different sector sizes, shapes, and/or altitudes of sectors utilized by the drones. Conditions can include, for example, a ground-based sensor being triggered, e.g., by motion or detecting an object. The response can also include adding or removing active drones patrolling the area. Some examples are discussed below.

Example Flight Plans and Transitions

Several different arrangements of drones among sectors and flight plans will be discussed below with respect to FIGS. 6-9. The drones may be launched and may transition in and out of the airspace according to processes such as those discussed further above using transition spaces.

Figure 6:
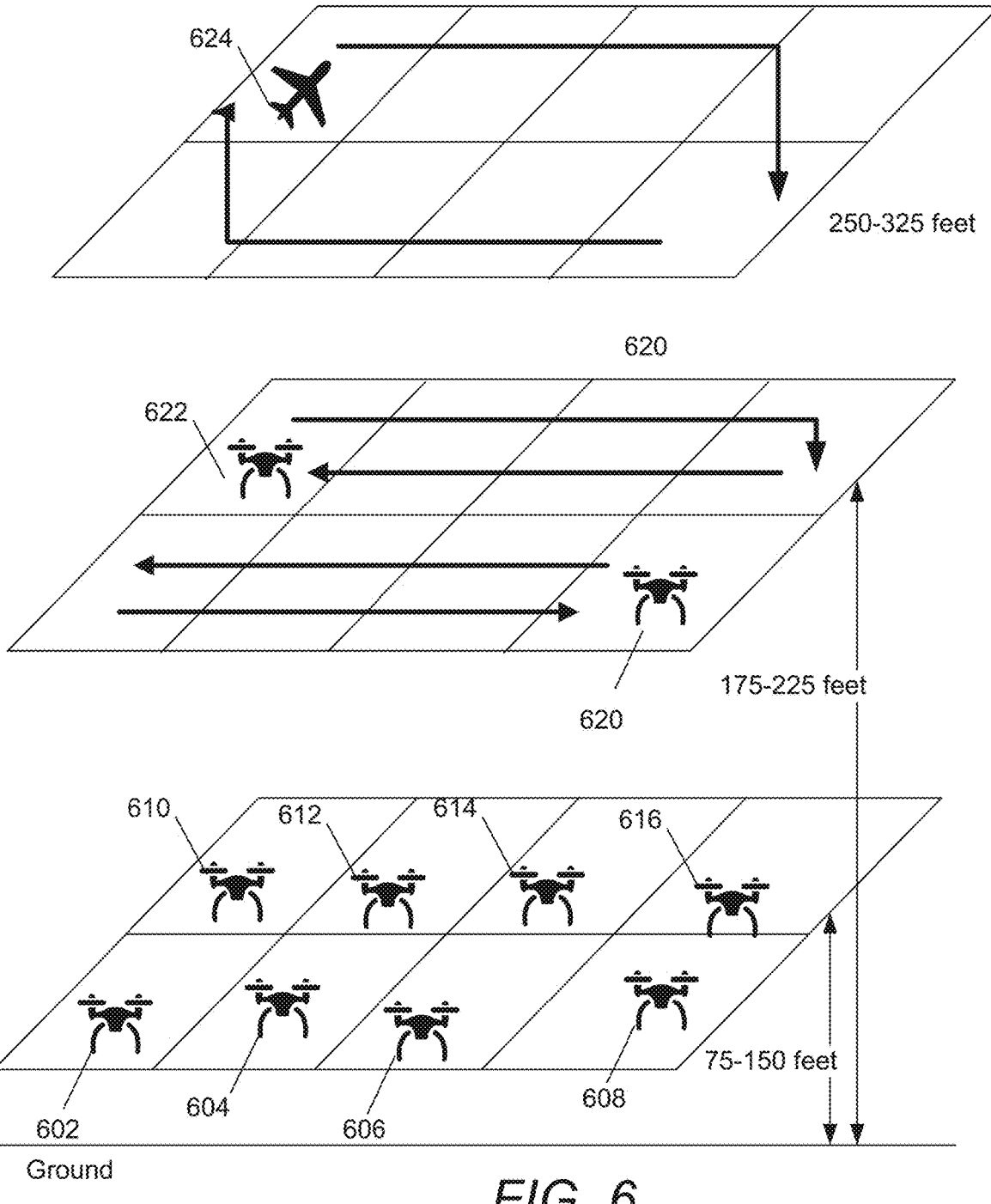
FIG. 6 illustrates an example airspace populated with drones in accordance with an embodiment of the invention.

In the example of FIG. 6, a first layer of the airspace has a floor of 75 feet and a ceiling of 150 feet. The sectors of the first layer are populated with multicopters 602, 604, 606, 608, 610, 612, 614, and 616 having imaging sensors (e.g., RGB, thermal, simple photogrammetry). Each multicopter is directed to fly a regular pattern within its assigned sector. The airspace from 150 feet to 175 feet can be used as a buffer or transition space. A second layer from 175 feet to 225 feet is populated with multicopters 620 and 622 having faster scanning sensors such as lidar that fly a pattern over 1×4 sectors. The airspace from 225 feet to 250 feet can be used as a buffer or transition space. In a third layer from 250 feet to 325 feet, a fixed wing drone 624 flies an orbital path and uses an infrared camera. The airspace from 325 feet to 350 feet can be used as a buffer or transition space. The airspace from 350 feet to 400 feet can be used as transitional space.

Figure 7A:
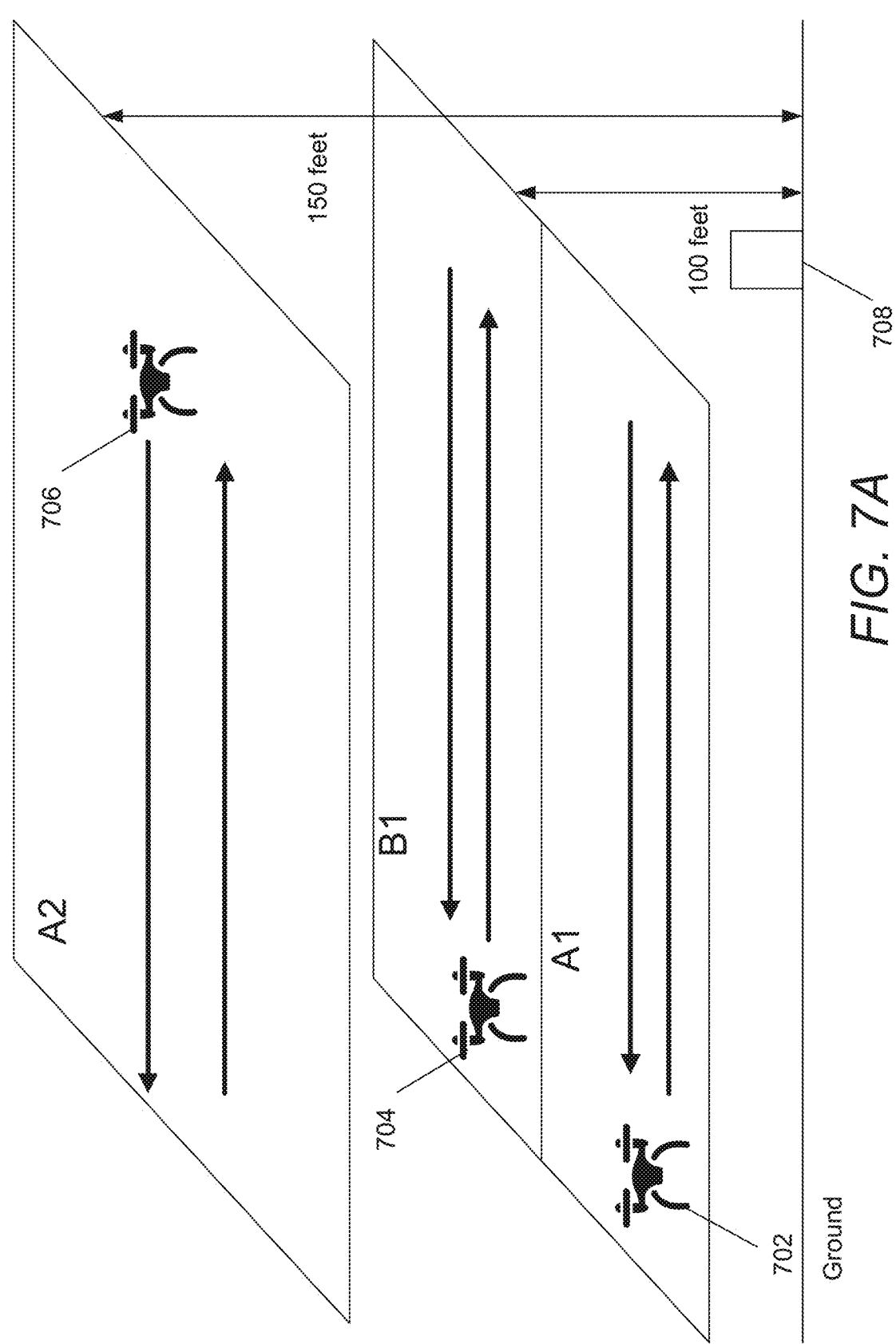
FIG. 7A illustrates an example airspace populated with drones in accordance with an embodiment of the invention.

In the example of FIG. 7A, two drones 702 and 704 patrol long rectangular sectors A1 and B1 in the first layer at 100 feet. A drone 706 patrols sector A2 in the second layer at 150 feet in the opposite direction from the drones 702 and 704 in the first layer. The airspace above 175 feet may be used as a transitional space.

Figure 7B:
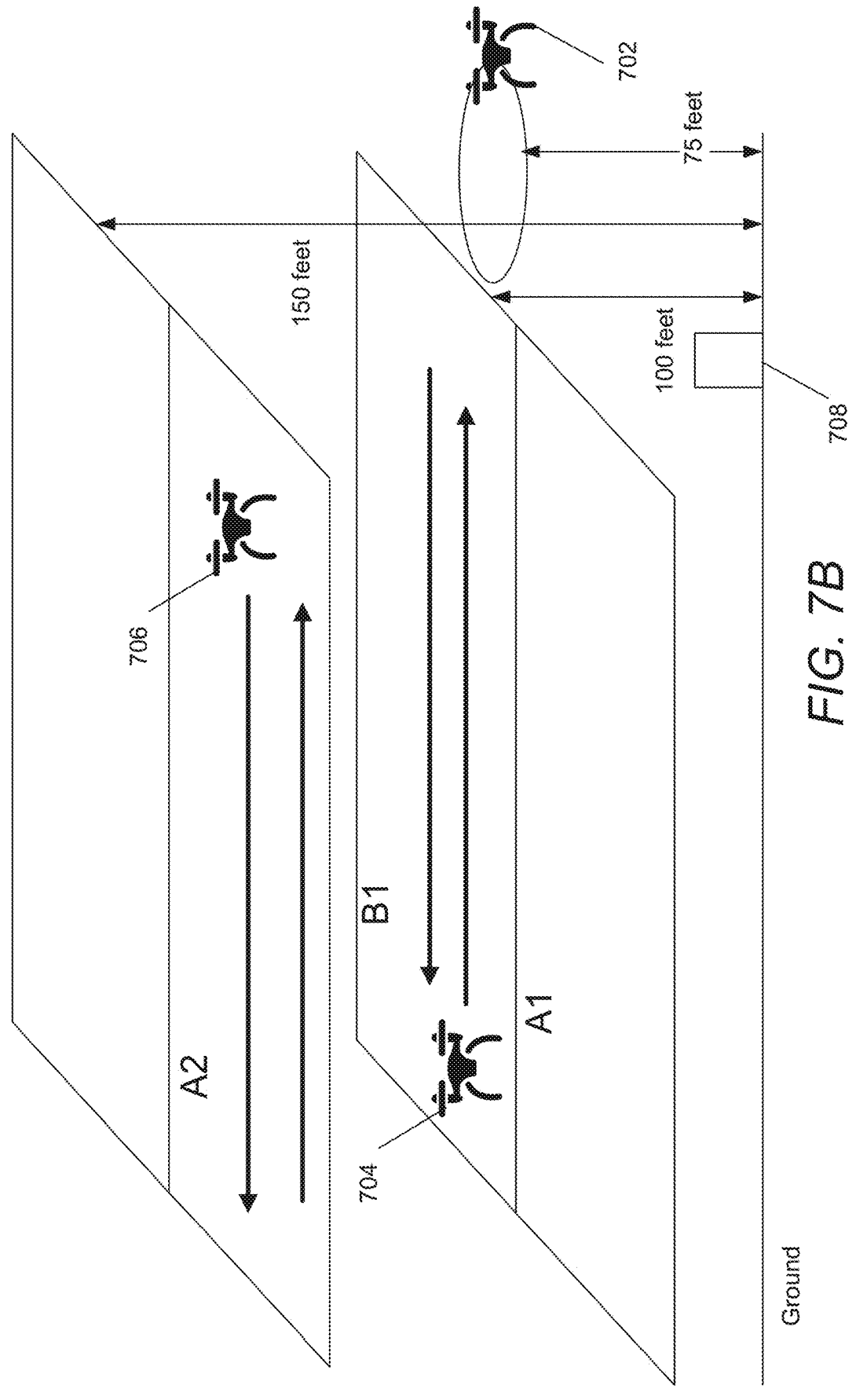
FIG. 7B illustrates the example airspace of FIG. 7A modified after an event in accordance with an embodiment of the invention.

A ground-based motion sensor 708 may be triggered by sensing something coming within its range. In response to the sensor 708 being triggered, the drones are assigned new flight paths as shown in FIG. 7B. Drone 702 is directed to orbit at 75 feet in the area of the motion sensor 708. Drone 704 remains in its sector B1. Drone 706 shifts to a modified sector A2 that is narrower and offset to sector B1.

Figure 8:
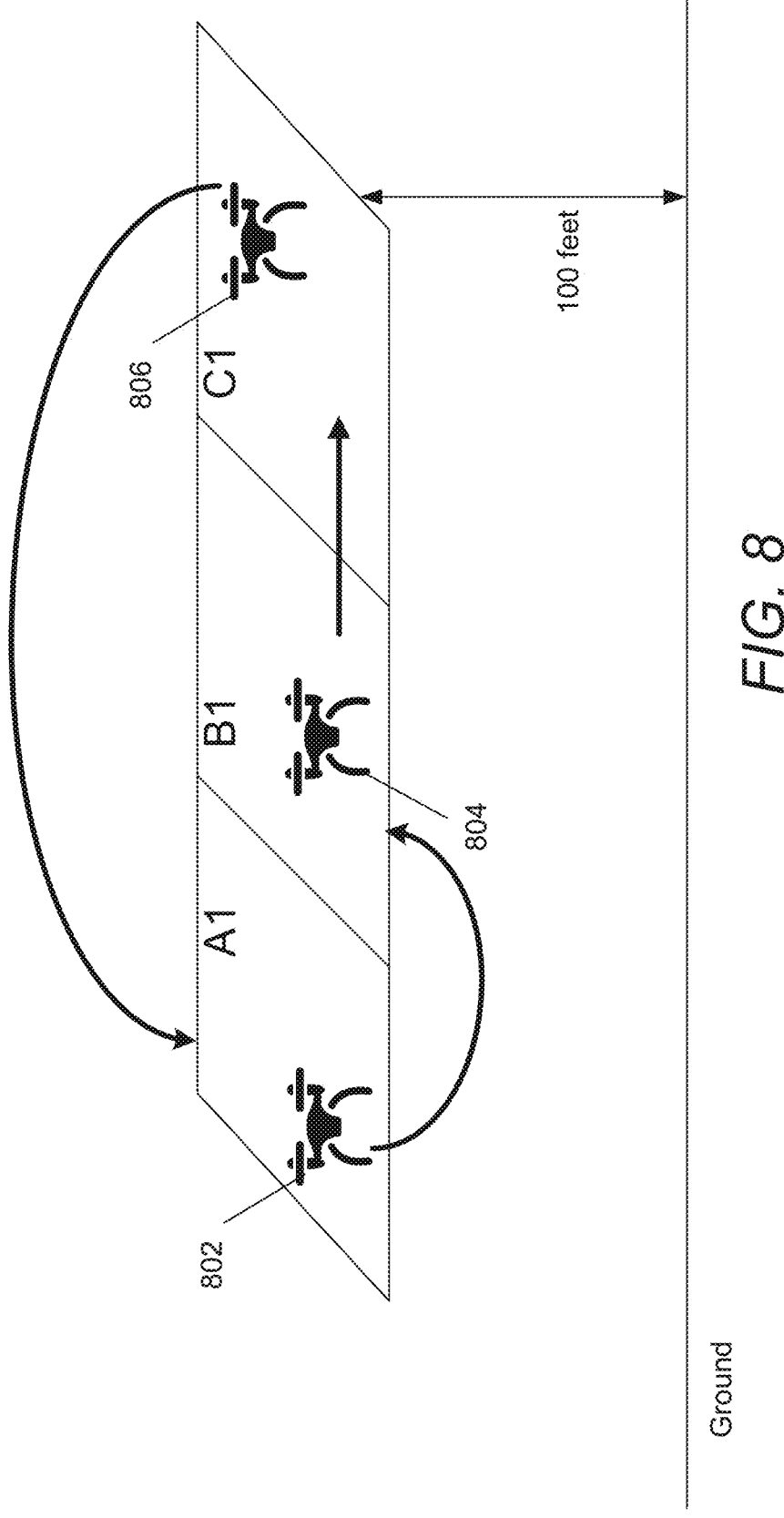
FIG. 8 illustrates an example airspace populated with drones in accordance with an embodiment of the invention.

In the example of FIG. 8, three drones 802, 804, and 806 patrol sectors A1, B1, and C1 within a single layer respectively. Upon a transition event, drone 804 moves to sector C1, drone 806 moves to sector A1, and drone 802 moves to sector B1. During their transitions, one or more of the drones may be replaced by another drone as it moves to its new sector.

While specific examples of divided airspaces having sectors, flight paths, and transitions of drones are discussed above, one skilled in the art will recognize that any variations may be implemented in accordance with embodiments of the invention as appropriate to a particular application.

Conclusion

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for coordinating drones flying in a divided airspace, the method comprising:

sending patrol instructions to each drone of a set of airborne drones in a divided airspace, where the divided airspace comprises mutually exclusive horizontal layers having a ceiling altitude and a floor altitude and at least one transition space layer, where the mutually exclusive horizontal layers comprise sectors, where the patrol instructions to each drone direct the drone into a flight path within a sector within the divided airspace, and where the at least one transition space layer is a horizontal layer between two other horizontal layers;

sending first transition instructions to a first drone of the set of airborne drones, where the first transition instructions direct the first drone to move vertically from its sector into a transition space layer and to horizontally traverse the transition space layer to exit the divided airspace;

sending second transition instructions to a second drone that is not within the set of airborne drones, where the second transition instructions direct the second drone to move from outside the divided airspace to horizontally traverse a transition space layer and move vertically from the transition space layer into the sector that the first drone left.

2. The method of claim 1 further comprising:

launching each drone in the set of airborne drones; and sending initialization instructions to each drone that direct the drone to navigate to its assigned sector.

3. The method of claim 1, further comprising:

directing each drone to capture sensor data using an onboard sensor while patrolling its sector.

4. The method of claim 1, wherein at least one drone includes a visible light camera and at least one drone includes an infrared camera.

5. The method of claim 4, wherein at least one other drone includes a lidar sensor.

6. The method of claim 1, wherein the sectors of a layer of the mutually exclusive horizontal layers are uniform in shape and size.

7. The method of claim 1, wherein the sectors of a layer of the mutually exclusive horizontal layers are not uniform in shape and size.

8. The method of claim 1, wherein a maximum of two drones are assigned to any sector.

9. The method of claim 8, wherein any two drones within a sector are assigned different altitudes.

10. The method of claim 1, wherein the drones within a layer of the mutually exclusive horizontal layers have the same type of sensor.

11. The method of claim 1, further comprising sending updated patrol instructions to at least one drone that directs the at least one drone to move to a different sector and patrol that sector.

12. The method of claim 1, further comprising sending updated patrol instructions to at least one drone, where the updated patrol instructions implement changes to shape of at least one sector in the divided airspace.

13. The method of claim 1, wherein the first transition instructions direct the first drone to achieve an altitude within the transition space layer.

14. The method of claim 1, wherein the second transition instructions direct the second drone to achieve an altitude within the transition space layer.

* * * * *